(12) United States Patent
Wolfram

(10) Patent No.: US 11,705,798 B2
(45) Date of Patent: Jul. 18, 2023

(54) ELECTRIC MOTOR COMPRISING AN INTEGRATED ROTARY ENCODER

(71) Applicant: Lenze SE, Aerzen (DE)

(72) Inventor: Rouven Wolfram, Hessisch Oldendorf (DE)

(73) Assignee: Lenze SE, Aerzen (DE)

( * ) Notice: Subject to any disclaimer, the term of this patent is extended or adjusted under 35 U.S.C. 154(b) by 298 days.

(21) Appl. No.: 17/046,818

(22) PCT Filed: Apr. 10, 2019

(86) PCT No.: PCT/EP2019/059153
§ 371 (c)(1),
(2) Date: Oct. 12, 2020

(87) PCT Pub. No.: WO2019/197495
PCT Pub. Date: Oct. 17, 2019

(65) Prior Publication Data
US 2021/0159763 A1    May 27, 2021

(30) Foreign Application Priority Data
Apr. 12, 2018   (DE) .......................... 102018108716.0

(51) Int. Cl.
*H02K 29/08*     (2006.01)
*H02K 11/01*     (2016.01)
*H02K 11/215*    (2016.01)
*H02K 7/102*     (2006.01)

(52) U.S. Cl.
CPC ............. *H02K 29/08* (2013.01); *H02K 7/102* (2013.01); *H02K 11/0141* (2020.08); *H02K 11/215* (2016.01)

(58) Field of Classification Search
CPC .... H02K 29/08; H02K 7/102; H02K 11/0141; H02K 11/215; H02K 7/00; H02K 7/10; H02K 7/104; H02K 7/106; H02K 7/112; H02K 7/114
USPC .......................... 310/66, 67 R, 75 R, 76, 77
See application file for complete search history.

(56) References Cited

U.S. PATENT DOCUMENTS

| | | | |
|---|---|---|---|
| 2004/0012286 A1* | 1/2004 | Zens ..................... | F16C 41/007 310/90 |
| 2008/0246357 A1* | 10/2008 | Johnson ................... | H02K 5/15 310/90 |
| 2009/0284105 A1* | 11/2009 | Miyashita ............ | H02K 5/1732 310/68 B |

FOREIGN PATENT DOCUMENTS

| | | | |
|---|---|---|---|
| DE | 20011138 U1 | | 12/2001 |
| DE | 2005 004 434 U1 | | 7/2005 |
| DE | 102004059181 | * | 6/2006 |
| DE | 10 2005 050 271 A1 | | 4/2007 |
| DE | 10 2011 012 357 A1 | | 8/2012 |
| DE | 102011012357 A1 | | 8/2012 |
| DE | 102012019001 A1 | | 3/2014 |

(Continued)

OTHER PUBLICATIONS

DE 102014011228 (Year: 2016).*

*Primary Examiner* — Ahmed Elnakib
(74) *Attorney, Agent, or Firm* — Muirhead and Saturnelli, LLC

(57) ABSTRACT

An electric motor has an end shield and a sensor for detecting a magnetic field. The sensor is integrated into the end shield of the electric motor. An electric drive unit may include a brake, in particular an electromagnetically actuatable brake, and an electric motor, where a shielding element is arranged between the sensor and the brake.

13 Claims, 4 Drawing Sheets

(56) References Cited

FOREIGN PATENT DOCUMENTS

| | | | |
|---|---|---|---|
| DE | 102015218856 | * | 3/2017 |
| DE | 102015218856 A1 | | 3/2017 |
| WO | WO 2009/015496 A1 | | 2/2009 |

* cited by examiner

ELECTRIC MOTOR COMPRISING AN INTEGRATED ROTARY ENCODER

TECHNICAL FIELD

The system described herein relates to an electric motor and to an electric drive unit having an electric motor.

BACKGROUND OF THE INVENTION

According to the prior art, so-called rotary encoders are used to sense movement data of the motor shaft of an electric motor. The movements of the motor shaft sensed in this manner may be, for example, the rotational speed.

A common principle according to which such rotary encoders can sense movements of the motor shaft is based on the sensing of magnetic fields, by a sensor suitable for sensing a magnetic field. This sensor senses a magnetic field generated by an encoder element. For this purpose, the encoder element is normally connected to the shaft. The movement of the encoder element therefore follows the movement of the shaft. The sensor is expediently arranged in a fixed manner relative to the stationary components of the electric motor, in particular to its housing. In this way a relative movement is produced between the encoder element and the sensor. Since, in turn, the magnetic field generated by the encoder element follows the movement of the encoder element, the magnetic field sensed by the sensor changes due to this movement. These changes in the magnetic field sensed by the sensor can then be used to deduce the underlying movement and/or position of the motor shaft.

According to the prior art, a sensor of the type in question is located in a separate housing. It is arranged on the motor shaft, and is normally connected to the housing of the electric motor, in particular to an end shield of the electric motor, by means of a suitably designed connection, for example by means of a flange.

However, such a design is complex, since a separate housing is required for the rotary encoder. This housing must normally accommodate not only the sensor, but also enclose the encoder element arranged on the shaft. A further consequence of arranging the rotary encoder in a separate housing is that additional space is required along the motor shaft, which results in a correspondingly longer motor shaft, and thus in a correspondingly greater space requirement for the drive system.

It is desirable to have an electric motor and an electric drive unit that are less expensive and/or render possible a more compact design than those available today.

SUMMARY OF THE INVENTION

In an embodiment of the system described herein, an electric motor has a sensor, for sensing a magnetic field, which is integrated into an end shield of the electric motor.

It has been shown that, in the case of end shields of conventional electric motors, the end shield normally occupies so much space that it is possible to integrate a sensor, for sensing a magnetic field, into the end shield without thereby adversely affecting the functionality of the end shield.

In embodiments of the system described herein, the electric motor may have an encoder element for generating a magnetic field that can be sensed by the sensor. It may be arranged in the region of the end shield, in a direction parallel to the axis, or shaft, of the electric motor. Arrangement of the encoder element in the region of the end shield may be advantageous because the encoder element, which in particular may be connected to the shaft in a rotationally fixed manner, thus also may not give rise to any requirement for additional space on the shaft, or the additional shaft of the shaft required for the rotary encoder at least may be minimized.

The encoder element may be designed in such a manner that the magnetic field generated by it fluctuates, or is subject to fluctuations, in the circumferential direction around the shaft of the electric motor. This may be achieved, for example, by the encoder element having a plurality of permanent magnets distributed in the circumferential direction around the shaft.

The electric motor may have a shielding element for magnetic shielding of the sensor against a magnetic field acting externally upon the electric motor. This shielding element may be, for example, a shielding plate. Such a shielding element has the advantage that external influences of a magnetic nature, which could interfere with the proper operation of the sensor, may be shielded by it. Such interfering magnetic fields may be caused, for example, by electromagnetically operated brakes arranged on the shaft and/or in extension of the motor shaft.

The shielding element may be an element made of an electrically conductive material. Electrically conductive materials are particularly suitable for shielding electromagnetic fields. The electrically conductive material also may be a metal.

The shielding element may be of a flat design, and in particular may be arranged relative to the shaft in such a manner that its extent in the direction at least substantially perpendicular to the shaft is substantially greater than its thickness in the direction at least substantially parallel to the shaft. Such an arrangement, or configuration, of the shielding element has the advantage that it occupies little space along the shaft.

The encoder element may be arranged between the bearing of the electric motor supported by the end shield and the shielding element. This arrangement offers the advantage, on the one hand, that the encoder element is located in the region shielded by the shielding element. Furthermore, the otherwise unused space between the shaft and the end shield in this region advantageously may be used in this arrangement of the encoder element.

The end shield may have a seating surface for supporting the shielding element in a direction parallel to the axis of the electric motor, or axial direction. This seating surface may be suitable and designed, in particular, to take up a mechanical force applied to the shielding element. In this way, it is possible to apply a mechanical load to the shielding element. Flat support on a corresponding seating element thus may enable mechanical forces, in particular mechanical forces directed parallel to the shaft, or axis, of the electric motor, to be introduced into even a comparatively thin shielding element. This is useful, in particular, if other elements of a drive unit, of which the electric motor is a component, are to be coupled to the end shield. These further components may be, for example, a brake. The seating surface then makes it possible for forces generated by the brake, for example, to be introduced into the end shield via the shielding element. Thus, in particular, friction linings of the brakes may be supported on the end shield via the shielding element.

The end shield may have a recess for receiving the sensor and/or a recess for receiving a cable connected to the sensor. The recess may be designed such that it is set back from the seating surface in a direction parallel to the axis, or shaft, of the electric motor, or forms a depression in the seating surface. Surprisingly, it has been shown that it is possible to interrupt the support of the shielding element by the seating surface in individual zones of the seating surface without significantly impairing the support function. In this way, it is possible to create a receiving space, for the sensor and/or a cable connected to the sensor, that in particular is closed by the shielding element. This arrangement may allow easy mounting of the sensor, and of a cable provided for the supplying sensor.

The end shield may be, for example, a cast part. In particular, a recess for receiving the sensor and/or a strain relief element for a cable connected to the sensor may be molded into the end shield by appropriate casting. The recesses also may be designed so as to be open toward the shielding element and thus allow a simple configuration of the casting, in particular since there may be no undercuts. A flat shielding element, in particular, may enable the recesses to be closed in a simple manner.

A seat for a sealing element also may be provided on the shielding element. The sealing element may serve, in particular, to ensure a seal between the shielding element and the motor shaft. This arrangement may result in an overall advantageous design, as in this way the shielding element not only may provide shielding against electromagnetic influences, but also a protective function against other harmful environmental influences, for example, the ingress of dirt.

An electric motor of the type described above may be combined with a brake to form a drive unit. In this case, the shielding element may be arranged between the sensor and the brake. The shielding element thus may shield the sensor from electromagnetic fields caused by the brake. Particularly in the case of spring-loaded brakes that can be actuated electromagnetically, powerful electromagnets may be used to release, or lift, the brakes and/or to hold the brakes in the lifted, or released, state. Their interfering influences can be kept away from the sensor by the shielding element.

It is possible for a surface of the shielding element that faces toward the brake to form a friction face of the brake. For this purpose, in particular, a friction lining may be applied directly to the shielding element. Such an arrangement has the advantage that two separate components, namely a shielding element for electromagnetic shielding of the sensor, and a separate friction element, for example a friction plate, are not required. Instead, the shielding element also may assume the function of the friction element of the brake, thereby eliminating at least one component.

BRIEF DESCRIPTION OF THE DRAWINGS

Further practical embodiments and advantages of the system described herein are described below in conjunction with the drawings. There are shown.

DESCRIPTION OF VARIOUS EMBODIMENTS

Figure 1:
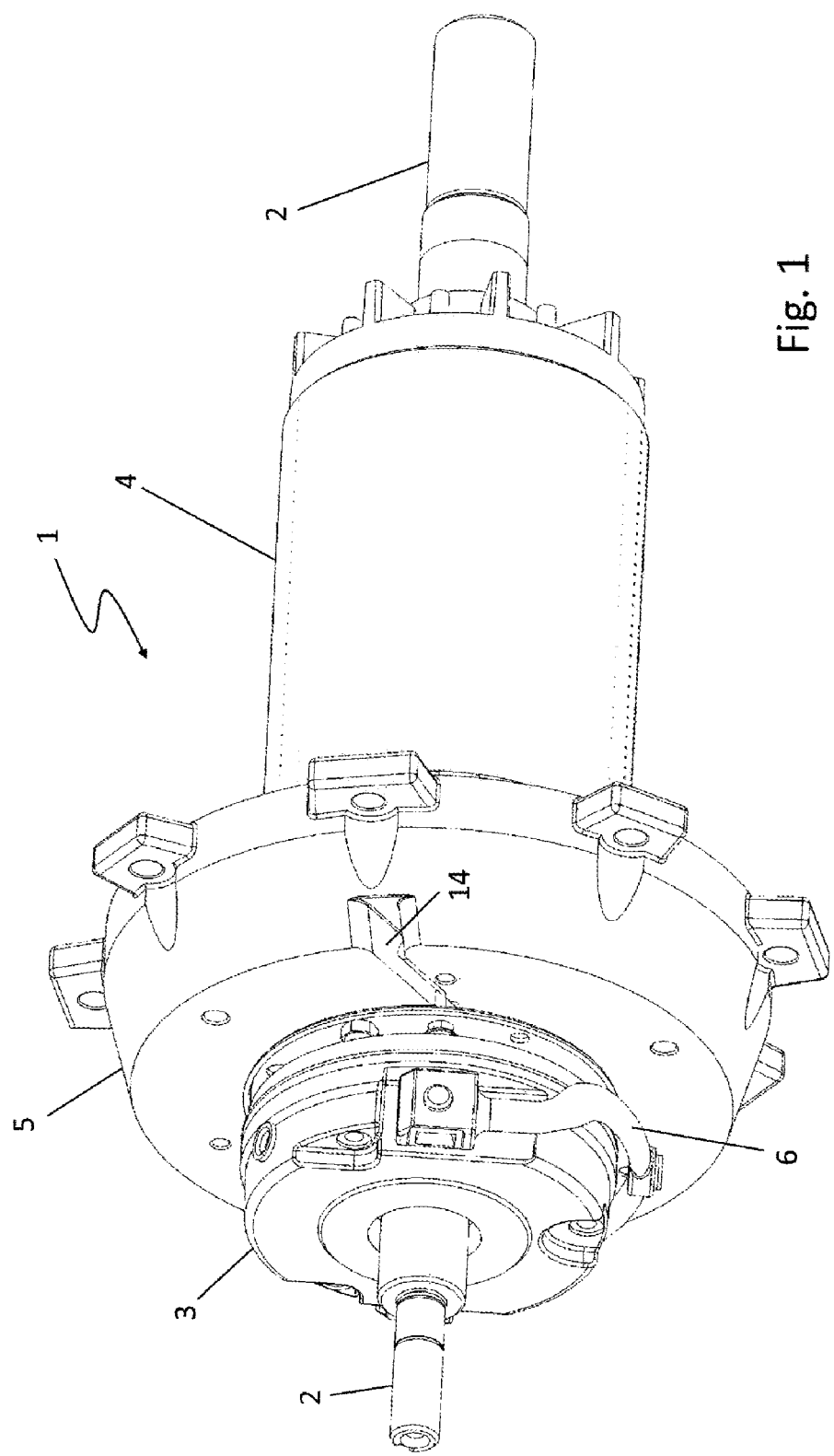
FIG. 1 is a perspective representation of a part of an electric drive unit according to the system described herein.
Figure 2:
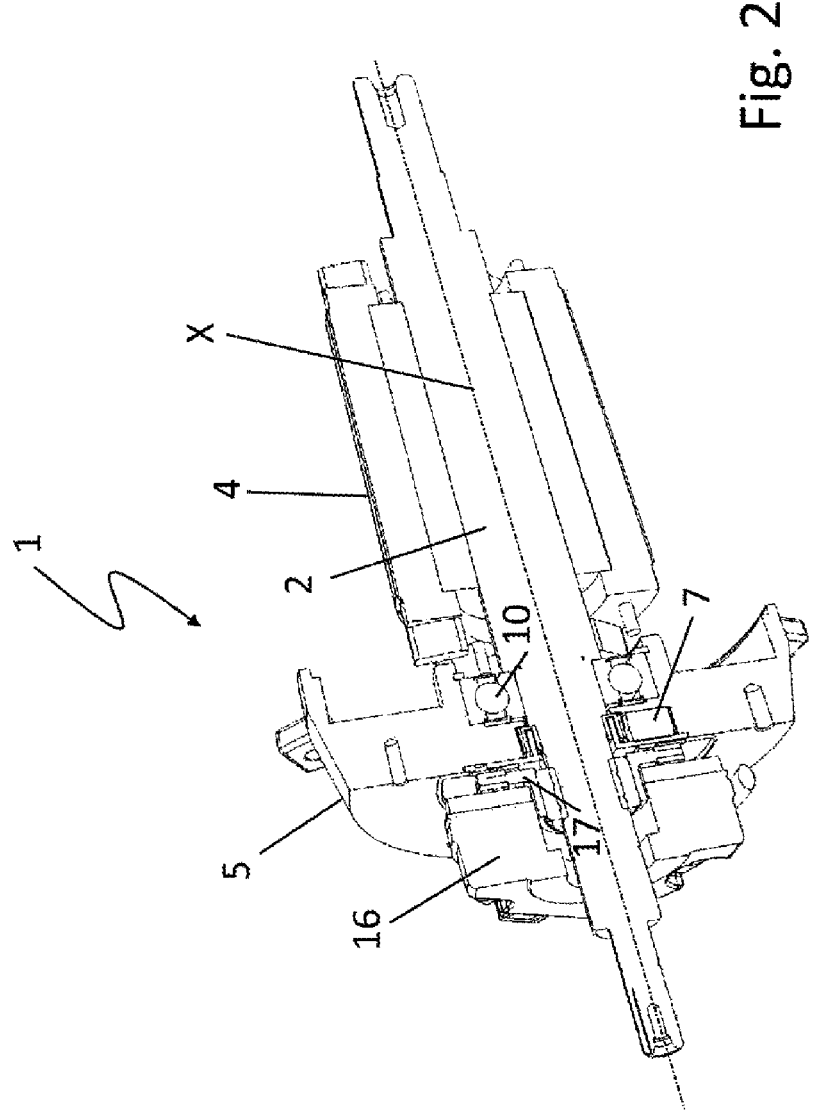
FIG. 2 is a perspective sectional representation of the part of the drive unit.
Figure 3:
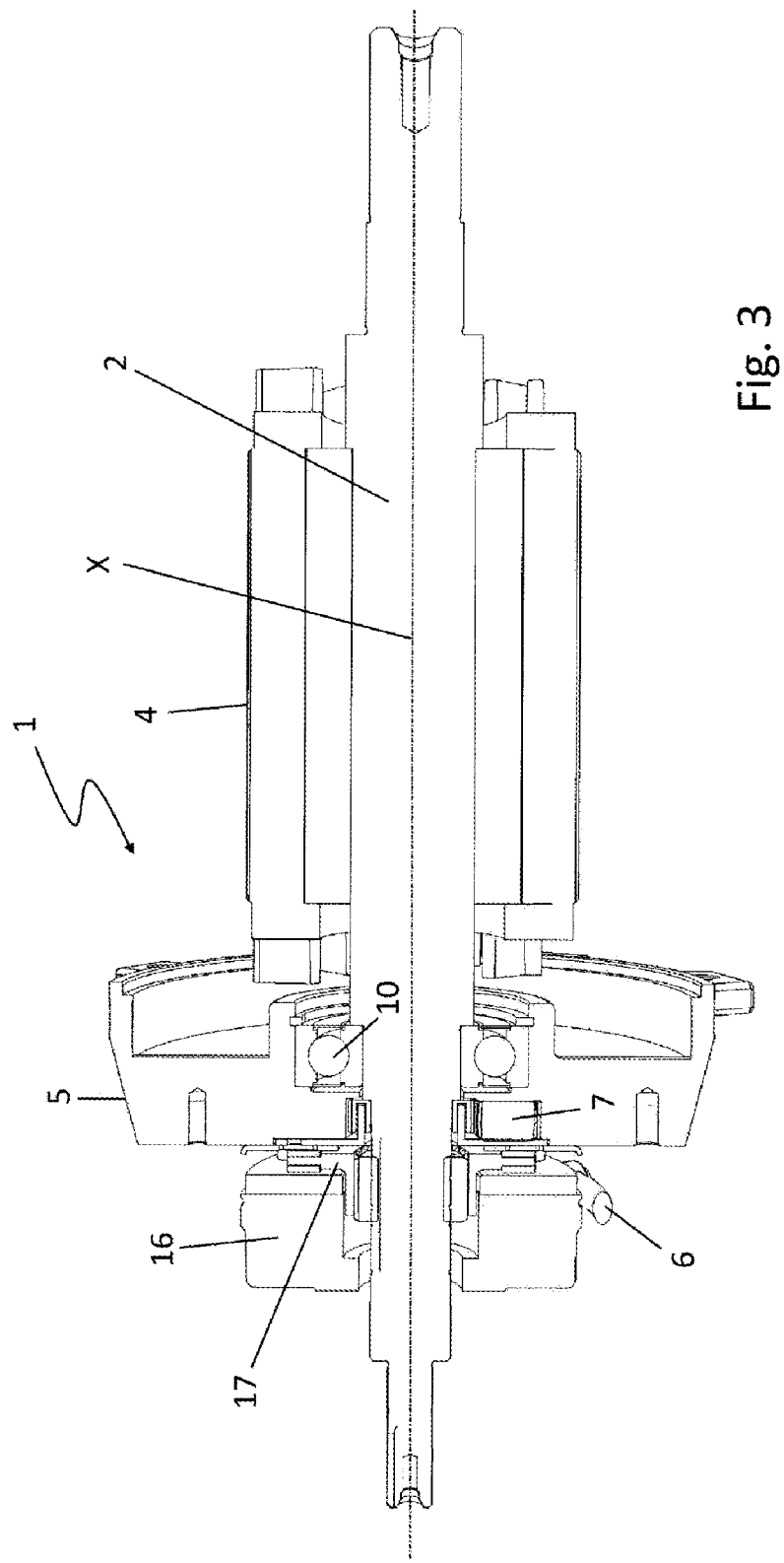
FIG. 3 is a cross-sectional representation of the part of the electric drive unit.
Figure 4:
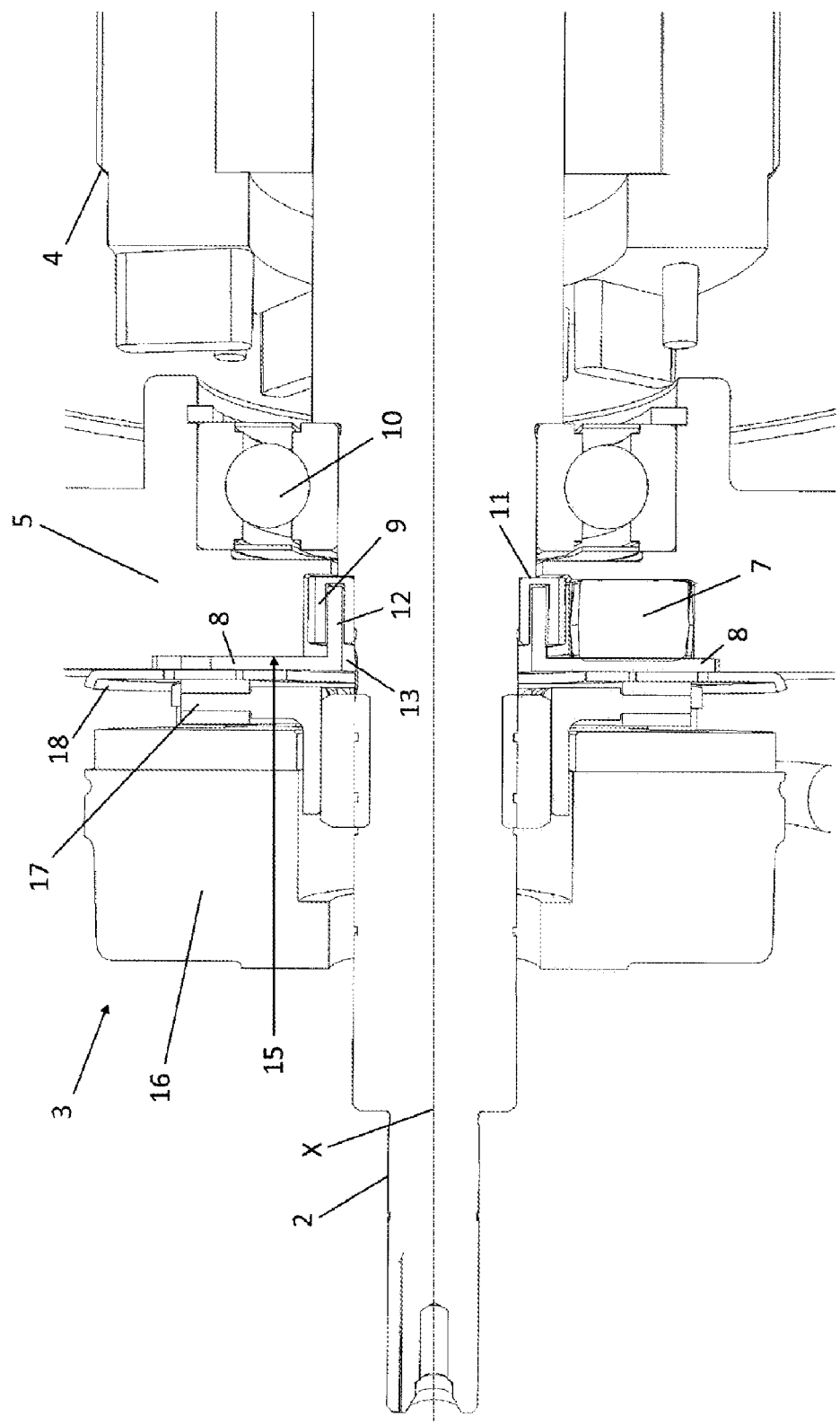
FIG. 4 is an enlarged partial representation of a region from FIG. 3.

In some embodiments, the electric drive unit 1 has an electric motor having a brake 3 arranged on the shaft 2 of the electric motor. Of the electric motor, only the rotor 4 and the end shield 5 facing the brake 3 are represented in the figures. In the example shown, the end shield 5 is the end shield opposite the output side of the electric motor, and also may be referred to as the B-end shield.

The brake 3 may be a spring-loaded brake that can be actuated electromagnetically. The brake 3 may have a manual lifter device 6. The sensor 7 may be integrated into the end shield 5. In the example shown, this integration may be made possible by a receiving space, in the form a recess for the sensor 7, that is molded into the end shield 5. The receiving space, or recess, may be closed—as shown as an example—by a shielding element 8.

As in the example shown, a recess 14 may be provided to receive a cable for connection to sensor 7 in the end shield 5. As in the example shown, it may be at least partially closed by the shielding element 8. The recess may have moldings and/or connection elements for fixing a strain relief element for the cable.

The encoder element 9 may be arranged on shaft 2 as in the example shown and, in particular, may be connected to shaft 2 in a rotationally fixed manner. In this context, a rotationally fixed connection is to be understood to mean, in particular, that the encoder element does not move on the shaft 2, in the circumferential direction of the shaft 2, when the electric motor, or the electric drive unit, is used as intended.

In a direction parallel to the axis X, or to the shaft 2, of the electric motor, the sensor 7 and the encoder element 9 may be arranged, as in the example shown, between the bearing 10 supported by the end shield 5 and the shielding element 8.

In the example shown, the encoder element 9 is supported on a shaft shoulder 11 in a direction parallel to the axis X of the electric motor. However, the support also may be effected in other ways, for example—if necessary with use of an intermediate element—on the bearing 10.

In the example shown, the shielding element 8 engages in the encoder element 9 in the manner of a labyrinth seal. For this purpose, the shielding element 8 may have a region 12 extending along the shaft 2. Alternatively and/or in addition, it is possible to attach a sealing element such as, for example, a rotary shaft seal, to the shielding element 8. This may be effected, for example, in the region of the surface 13 of the shielding element 8 that faces toward the shaft 2.

The end shield 5 may have a seating surface 15 for seating, or supporting, the shielding element 8 in the direction of the axis X of the electric motor. The recess for receiving the sensor 7 and the recess 14 for receiving the cable may be designed in such a manner that they are set back from the seating surface 15 as represented. Due to the flat bearing contact of the shielding element 8 and the seating surface 15, the shielding element 8 may take up comparatively large forces, which, at least substantially, are directed parallel to the axis X of the electric motor. The forces may be introduced via the shielding element 8 into the seating surface 15, which supports the shielding element 8 in a direction parallel to the axis X of the electric motor.

In the example represented, the brake may have a magnet housing 16, a brake rotor 17 and a friction plate 18. The brake rotor 17 may be connected to the shaft 2 in a rotationally fixed and axially displaceable manner. When the brake 3 is closed, or engaged, the brake rotor 17 is pressed against the friction plate 18. The forces thus introduced into the friction plate 18 along the axis X of the motor may be taken up by the shielding element 8 and introduced by it, via the seating surface 15, into the end shield 5. Alternatively, it is also possible for a surface of the shielding element 8 facing the brake to form a friction surface of the brake. Then, in particular, the friction plate 18 may be omitted. In this case, it is possible that, during closing, or engaging, of the brake, the brake rotor 17 is pressed directly onto this surface of the shielding elements 8. For this purpose, the surface of the shielding element 8 may have a suitable coating, especially a friction lining.

The features of the system described herein as disclosed in the present description, in the drawings and in the claims may be essential for the realization of the invention in its various embodiments, both individually or in any combination. The invention is not limited to the embodiments described. It may be varied within the scope of the claims, and in consideration of the knowledge of persons skilled in the art. Other embodiments of the system described herein will be apparent to those skilled in the art from a consideration of the specification and/or an attempt to put into practice the system described herein. It is intended that the specification and examples be considered as illustrative only, with the true scope and spirit of the invention being indicated by the following claims.

The invention claimed is:

1. An electric drive unit, comprising:
    a brake;
    an electric motor having an end shield and having a sensor that senses a magnetic field and is integrated into the end shield of the electric motor; and
    a shielding element arranged between the sensor and the brake, wherein a surface of the shielding element that faces toward the brake forms a friction surface of the brake.

2. The electric motor as claimed in claim 1, wherein the electric motor has an encoder element, connected in a rotationally fixed manner to a shaft of the electric motor, for generating a magnetic field that can be sensed by the sensor.

3. The electric motor as claimed in claim 2, wherein the encoder element is arranged, in a direction parallel to an axis of the electric motor, in a region of the end shield.

4. The electric motor as claimed in claim 3, wherein the encoder element is arranged between a bearing of the motor supported by the end shield and a shielding element.

5. The electric motor as claimed in claim 1, wherein the shielding element magnetically shields the sensor against a magnetic field acting externally on the electric motor.

6. The electric motor as claimed in claim 1, wherein the end shield has a seating surface for supporting the shielding element in a direction parallel to the electric motor.

7. The electric motor as claimed in claim 6, wherein the seating surface is for taking a mechanical force applied to the shielding element.

8. The electric motor as claimed in claim 1, wherein the end shield has a recess for receiving the sensor and/or a recess for receiving a cable connected to the sensor.

9. The electric motor as claimed in claim 8, wherein the recess for receiving the sensor and/or the recess for receiving a cable connected to the sensor is set back from a seating surface in a direction parallel to an axis of the electric motor, and/or forms a depression in the seating surface.

10. The electric motor as claimed in claim 1, wherein the end shield is a cast part.

11. The electric motor as claimed in claim 10, wherein a recess for receiving a cable, a recess for receiving the sensor and/or a receiver for a strain relief element for the cable are formed into the end shield by casting.

12. The electric motor as claimed in claim 1, wherein the shielding element includes a shielding plate.

13. The electric drive unit as claimed in claim 1, wherein the brake is electromagnetically actuated.

* * * * *